United States Patent Office 3,256,283
Patented June 14, 1966

3,256,283
2,4,7-TRIAMINO-6-(2,6-DISUBSTITUTED PHENYL)PTERIDINES
Thomas S. Osdene, Berwyn, and Peter B. Russell, Villanova, Pa., assignors to American Home Products Corporation, New York, N.Y., a corporation of Delaware
No Drawing. Filed Mar. 19, 1965, Ser. No. 441,301
6 Claims. (Cl. 260—251.5)

This invention relates to new compounds of the pteridine series.

More particularly, this invention relates to novel 2,4,7-triamino-6-(2,6-disubstituted phenyl)pteridines and to the method of which such compounds are prepared.

Considered in their broadest aspect, the novel compounds of the present invention include those encompassed within the following formula:

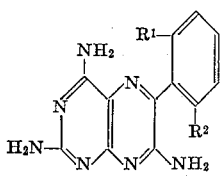

wherein $R^1$ and $R^2$ are selected from the group consisting of halogen and lower alkyl. $R^1$ and $R^2$ may of course be similar or dissimilar depending on the structure of the starting material.

The reaction by which the compounds of the present invention may be prepared is shown in the reaction sequence set forth below:

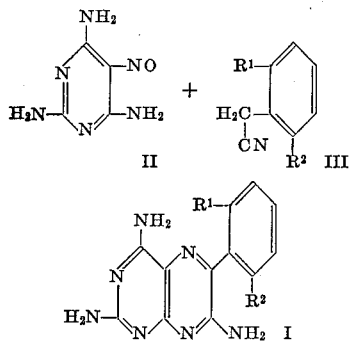

The 2,4,7-triamino-6-(2,6-disubstituted phenyl)pteridines (I) of the present invention are prepared by condensing 2,4,6-triamino-5-nitrosopyrimidine with the appropriate 2,6-dihalo or 2,6-dilower alkyl phenyl acetonitrile. The condensation is accomplished in accordance with the reaction sequence shown by heating these compounds in a suitable solvent such as for example 2-ethoxyethanol, butanol, formamide and dimethylformamide in the presence of sodium or an anhydrous sodium compound such as sodium ethoxide or sodium methoxide. The condensation is preferably accomplished in the presence of anhydrous 2-ethoxyethanol, a sodium metal. The resulting and desired pteridine product is precipitated and may be recrystallized according to conventional practice, such as for example from aqueous dimethylformamide.

The starting materials identified by II and III in the reaction sequence shown are known or are readily preparable by known methods. The 2,4,6-triamino-5-nitrosopyrimidine (II) is prepared by the conventional treatment of 2,4,6-triaminopyrimidine with nitrous acid. The acetonitriles (III) used are known compounds and are commercially available. They require substituents on the phenyl ring falling within the scope of those defined previously, namely $R^1$ and $R^2$.

While not identified in Formula 1 above, the new compounds of the present invention also encompass the pharmaceutically acceptable, nontoxic, acid addition salts thereof. Such salts are prepared according to conventional technique by reacting the free base with a suitable acid in a lower alcohol and then evaporating the alcohol solvent to leave the salt. Alternatively, salt formation can be carried out in an aqueous slurry or solution. Suitable acids for the purpose described include hydrobromic, sulfuric, phosphoric, nitric, benzoic, methyl sulfonic, p-tolyl sulfonic, benzene sulfonic, naphthalene sulfonic, salicylic, glycolic, acetic, maleic, succinic, tartaric, stearic, palmitic, citric, glutaric, lactic and the like.

The new compounds of the present invention have been found to possess valuable properties including antibacterial activity. Quite unexpectedly, they possess marked antibacterial activity against Gram negative organisms. When compared with known compounds of similar activity, the new compounds show a reversal in spectrum of effectiveness which is most uncommon.

When used for the foregoing purposes, the new compounds of the present invention may be combined with suitable carriers in accordance with the purpose and manner in which the compounds are to be used. The new compounds may be given orally in amounts of from about 0.5 to about 4.0 grams and in substantially similar amounts of 5% solutions. Topically they may be used as a powder, 5% ointment, 2.5 to 3% spray or 2.5% solution. On this basis it will be seen that when used as antibacterial agents, the new compounds of the present invention are generally administered in a manner similar to known antibacterial compounds useful against Gram negative organisms.

Reference now to specific examples which follow will provide a better understanding of the new compounds of the present invention as well as the method by which they are prepared.

*Example I*

To a solution of 0.92 g. of sodium metal in 500 ml. of dried 2-ethoxyethanol there is added 6.16 g. of 2,4,6-triamino-5-nitrosopyrimidine, followed by 8.18 g. of (2,6-dichlorophenyl)acetonitrile. The mixture is stirred mechanically and boiled under reflux for 2 hours. After cooling the solution is evaporated to dryness on a rotary evaporator and the residue treated with water. A brown precipitate is obtained. After removal by filtration, the material is recrystallized from aqueous dimethylformamide to afford 2,4,7-triamino-6-(2,6-dichlorophenyl)pteridine, M.P. 352° effv.

Analysis.—Calculated: C=44.73, H=2.83, N=30.44, Cl=22.01. Found: C=44.85, H=2.83, N=30.10, Cl=21.90.

*Example II*

2,4,7-triamino-6-(2,6-dimethylphenyl)pteridine is prepared by the reaction of 2,4,6-triamino-5-nitrosopyrimidine with (2,6-dimethylphenyl)acetonitrile as described in Example I.

*Example III*

Reaction of 2,4,6-triamino-5-nitrosopyrimidine with (2-chloro-6-ethylphenyl)acetonitrile according to the method of Example I gives 2,4,7-triamino-6-(2-chloro-6-ethylphenyl)pteridine.

*Example IV*

Reaction of 2,4,6-triamino-5-nitrosopyrimidine with (2-bromo-6-methylphenyl)acetonitrile as described in Example I, gives 2,4,7-triamino-6-(2-bromo-6-methylphenyl)pteridine.

Example V

Following the procedure of previous examples, 2,4,7-triamino-6-(2-propyl-6-bromophenyl)pteridine is prepared by reacting 2,4,6-triamino-5-nitrosopyrimidine with (2-propyl-6-bromophenyl)acetonitrile.

The invention claimed is:

1. A compound selected from the group consisting of (1) a compound having the formula:

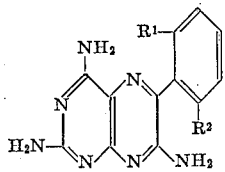

wherein $R^1$ and $R^2$ are selected from the group consisting of halogen and lower alkyl and (2) the nontoxic, therapeutically acceptable acid addition salts thereof.

2. 2,4,7-triamino-6-(2,6-dichlorophenyl)pteridine.
3. 2,4,7-triamino-6-(2,6-dimethylphenyl)pteridine.
4. 2,4,7-triamino-6-(2-chloro-6-ethylphenyl)pteridine.
5. 2,4,7-triamino-6-(2-bromo-6-methylphenyl)pteridine.
6. 2,4,7-triamino-6-(2-propyl-6-bromophenyl)pteridine.

References Cited by the Examiner

UNITED STATES PATENTS 3,081,230   3/1963   Weinstock et al. ____ 260—251.5

NICHOLAS S. RIZZO, *Primary Examiner.*

HENRY R. JILES, *Examiner.*